United States Patent [19]

Maurice

[11] Patent Number: 5,689,391

[45] Date of Patent: Nov. 18, 1997

[54] MAGNETO-OPTIC MULTITRACK READING HEAD HAVING A PLURALITY OF REFLECTIVE RAYS

[75] Inventor: François Maurice, Verrieres le Buisson, France

[73] Assignee: Thomson Consumer Electronics, Courbevoie, France

[21] Appl. No.: 732,730

[22] Filed: Oct. 18, 1996

Related U.S. Application Data

[63] Continuation of Ser. No. 433,031, May 3, 1995, abandoned, which is a continuation of Ser. No. 741,517, filed as PCT/FR90/00922 Dec. 10, 1991, published as WO91/10234 Jul. 11, 1991, abandoned.

[30] Foreign Application Priority Data

Dec. 28, 1989 [FR] France ............... 89 17313

[51] Int. Cl.$^6$ ............................................. G11B 11/10
[52] U.S. Cl. .................................................. 360/114
[58] Field of Search ................. 360/114, 59; 359/258, 359/280, 282, 484; 369/13, 110, 112, 54

[56] References Cited

U.S. PATENT DOCUMENTS

| | | | |
|---|---|---|---|
| 3,626,394 | 12/1971 | Nelson et al. | 360/114 |
| 3,636,535 | 1/1972 | Cushner et al. | 360/114 |
| 3,665,431 | 5/1972 | Alstad et al. | 360/114 |
| 4,609,961 | 9/1986 | Jacobs | 360/114 |
| 4,618,901 | 10/1986 | Hatakeyama et al. | 360/114 |
| 4,654,837 | 3/1987 | Browder | 369/13 |
| 4,707,755 | 11/1987 | Ohta et al. | 360/114 |
| 4,729,122 | 3/1988 | Itoh | 360/114 |
| 4,983,025 | 1/1991 | Umemura | 360/114 |

FOREIGN PATENT DOCUMENTS

| | | | |
|---|---|---|---|
| 0195628 | 9/1986 | European Pat. Off. | |
| 58-153244 | 9/1983 | Japan | 360/114 |
| 59-30255 | 2/1984 | Japan | 360/114 |
| 59-148161 | 8/1984 | Japan | 360/135 |
| 61-107553 | 5/1986 | Japan | 360/114 |
| 1117748 | 6/1986 | Japan | 360/114 |

OTHER PUBLICATIONS

Patent Abstracts of Japan, vol. 12, No. 112 (P.687) (2959), 9 Apr. 1988, & JP, A, 6224115 (Hitachi Ltd) 21 Oct. 1987.
Patent Abstracts of Japan, vol. 12, No. 34 (P-662) (2881), 2 Feb. 1988, & JP, A, 62185267 (Hitachi Ltd) 13 Aug. 1987.

*Primary Examiner*—Robert S. Tupper
*Assistant Examiner*—Brian E. Miller
*Attorney, Agent, or Firm*—Oblon, Spivak, McClelland, Maier & Neustadt, P.C.

[57] ABSTRACT

A magneto-optic multitrack reading head on which incident light impinges. The magneto-optic head includes a first layer of magnetic material exhibiting a Kerr effect and which partially reflects the incident light to generate a first reflection ray and which partially transmits the incident light to generate an internal ray. The magneto-optic head further includes a second layer of magnetic material and a layer of non-magnetic material, the non-magnetic layer having a thickness of one-half of a wavelength of the incident light and formed between the first and second layers of magnetic material and through which the internal ray passes. The internal ray is further reflected after passing through the layer of non-magnetic material to generate a second reflection ray parallel to and in-phase with the first reflection ray. The above structure improves the merit factor and signal-to-noise ratio of the magneto-optic reading head.

20 Claims, 8 Drawing Sheets

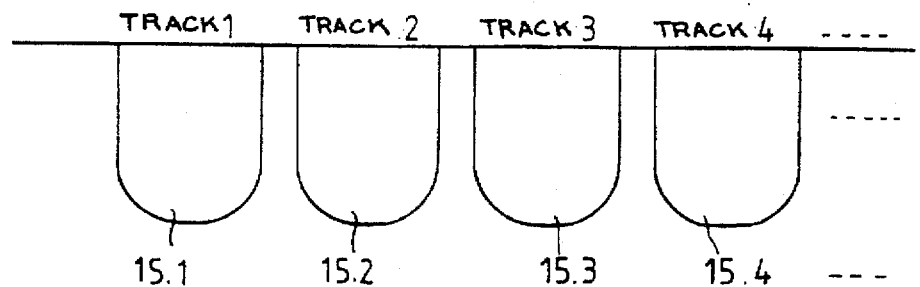
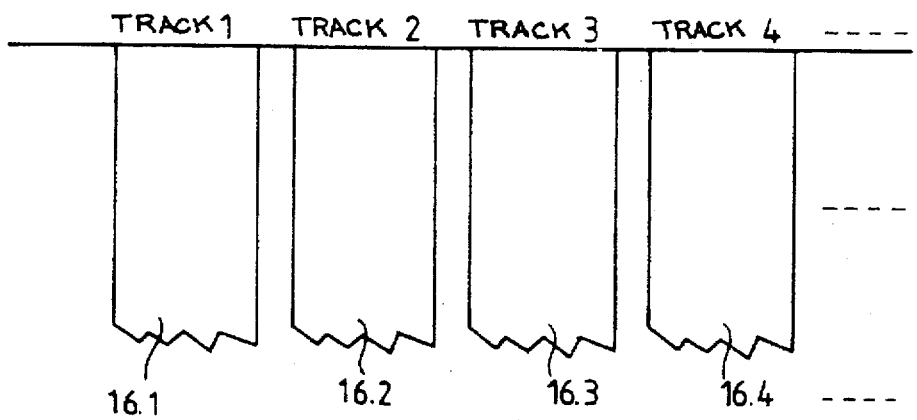
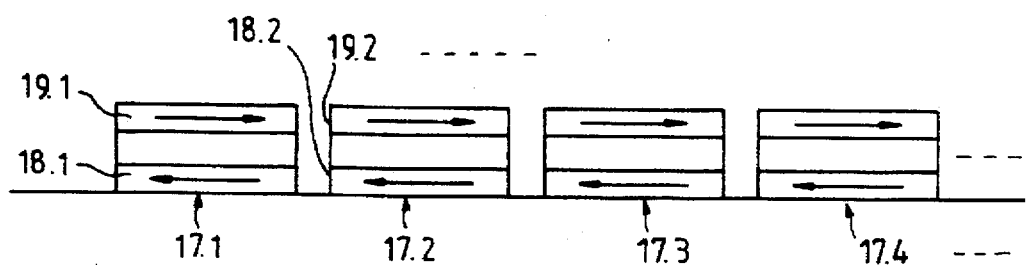

5,689,391

MAGNETO-OPTIC MULTITRACK READING HEAD HAVING A PLURALITY OF REFLECTIVE RAYS

This application is a Continuation of application Ser. No. 08/433,031, filed on May 3, 1995, now abandoned; which is a Continuation of Application Ser. No. 07/741,517 filed Aug. 9, 1991, now abandoned, which was filed as International Application No. PCT/FR90/00922 filed Dec. 18, 1990, published as WO91/10234 Jul. 11, 1991.

BACKGROUND OF THE INVENTION

1. Field of the Invention

The present invention relates to a magneto-optic multi-track reading head.

2. Discussion of the Background

It is known that for multitrack heads the product of the number of elementary heads times the speed of the magnetic tape is substantially equal to a constant. Consequently, when it is desired to read a large number of tracks, the relative head/tape speed is small, and if it were desired to use an inductive multitrack head, its output signal would be too small. In this case, recourse is had to reading heads functioning in active mode, in particular magneto-optic reading heads.

A known type of magneto-optic head employs the Faraday effect. This effect consists in magnetizing a magneto-optic material, such as garnet, by the magnetic flux produced by the moving magnetic tape, and in detecting this magnetization by virtue of the rotatory capability that it has on polarized light. The resolution of these known heads is limited by the natural size of the domains of the tape and by the size of the light spot for analysis, and furthermore, their efficiency is low and their output signal is highly noise-affected.

SUMMARY OF THE INVENTION

The subject of the present invention is a multitrack head for reading magnetic tape, which has good resolution, good efficiency, whose output signal is the least possible affected by noise, and which is easy and inexpensive to manufacture.

The multitrack reading head according to the invention comprises a magneto-optic transducer with a plane multilayer structure with at least one Kerr effect thin magnetic layer, at least one layer made of nonmagnetic material and one layer made of magnetic material with high magnetic circuit closing permeance. Preferably, the Kerr effect layer exhibits magnetic anisotropy, and its easy axis is in the plane of this layer and parallel to the magnetic tape to be read. The reading head of the invention employs the reading of longitudinal recordings. The thickness of the Kerr effect layer is such that the magnetic flux produced by the read tape brings it close to saturation.

BRIEF DESCRIPTION OF THE DRAWINGS

The present invention will be better understood on reading the detailed description of several embodiments, taken as non-limiting examples and illustrated by the attached drawings, in which:

FIG. 4 is a plan view of the set of heads of FIGS. 3A and 3B.

DESCRIPTION OF THE PREFERRED EMBODIMENTS

Figure 1:
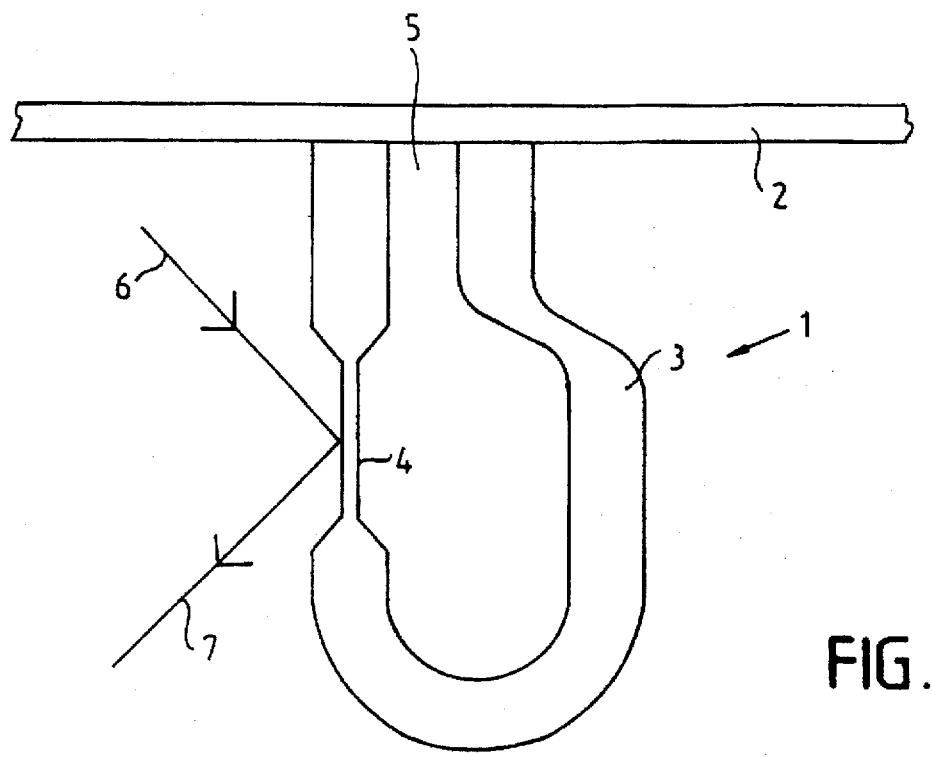
FIG. 1 is a schematic diagram of an elementary-head forming part of a reading head according to the invention.

The elementary reading head with high resolution represented diagrammatically in FIG. 1, is intended to read a magnetic tape 2 recorded with the aid of a multi-track writing head of any appropriate type. The head 1 comprises a magnetic circuit 3 in the form of a loop open at the level of the tape 2, with high permeability at a portion of which is constituted by a very thin magnetic layer 4 constituting the Kerr effect transducer. The magnetic circuit 3 is interrupted by a nonmagnetic, narrow inter-iron gap 5 at the level of the tape 2. The layer 4 is illuminated by an oblique incident optical beam 6, the path of which may be complex, as will be seen below when describing a few examples of embodiments of the present invention. The beam reflected by the layer 4 is labelled 7 and it is this beam which gathers the information corresponding to the variations in magnetization of the layer 4 caused by variations in the magnetic flux produced by the tape 2.

In order that the head 1 may function correctly, it is necessary in particular that:

the whole of the magnetic circuit 3 has a small reluctance, that the layer 4 has a very small thickness, so as to be magnetized virtually to saturation by the magnetic flux produced by the tape 2. Roughly speaking, the ratio: thickness of the layer 4/thickness of the magnetized layer of the tape 2 (1,000 to 10,000 Å approximately) must be substantially equal to the inverse of the ratio between the magnetization of the layer 4 at saturation and the magnetization of the tape 2. Given that this ratio is typically of the order of 5 to 10, the layer 4 advantageously has a thickness lying between 100 and 2,000 Å approximately. This layer 4 must, of course, have a very high magnetic permeability so as not to diminish the permeability of the whole magnetic circuit 3.

Figure 2:
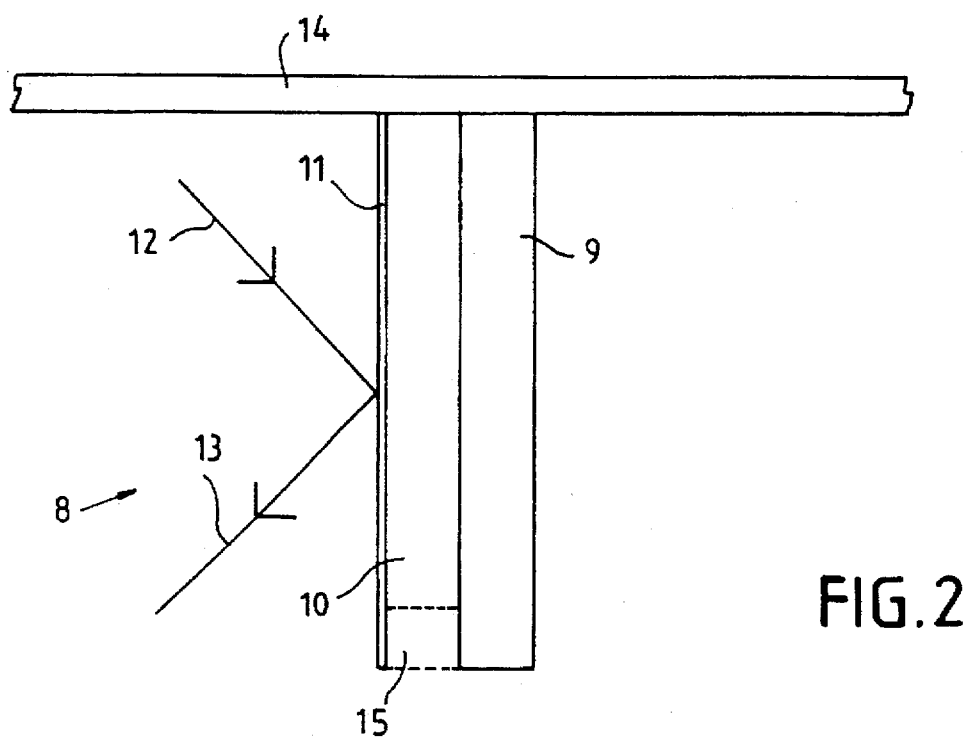
FIG. 2 is a diagram of a first embodiment of the head of FIG. 1, FIGS. 3A and 3B are simplified side views of a set of several elementary heads according to the invention.

In FIG. 2 has been represented a simplified diagram of an embodiment of an elementary head forming part of a multitrack head according to the invention, and which is much easier to manufacture than the head of FIG. 1. The elementary head 8 of FIG. 2 comprises a thick layer of magnetic material with high permeance 9, of a thickness which can attain several microns for example.

On the layer 9 are formed a layer 10 of non-magnetic material, of a thickness lying, for example, between 500 and 30,000 Å, and typically 3,000 Å approximately, and a thin layer 11 of magnetic material forming the Kerr effect layer. The thickness of the layer 11 lies, for example, between 100 and 2,000 Å approximately. An oblique incident optical beam 12 arrives at the layer 11, which reflects a beam 13. The layers 9 to 11 are polished on one of their edges, for example perpendicularly to their main surface, and the magnetic tape to be read 14 is applied to the thus polished surface. According to a variant represented in broken lines, at its end opposite that onto which the tape 14 is applied, the layer 9 can have a thickening 15 rejoining the beam 13 and thus closing the magnetic circuit of the head 8 to the side of this end. However, this thickening 15 is not absolutely necessary for the correct functioning of the head 8 because of the very small thickness of the layer 10 relative to the dimensions of the surfaces facing the layers 9 and 11.

The head of FIG. 2 can easily be produced in a single operation of depositing layers, and it is not absolutely necessary to etch the deposited layers, contrary to what would have to be done to produce the head of FIG. 1.

According to an embodiment of the head of FIG. 2, the two magnetic layers 9 and 11 have substantially the same thickness, namely a thickness lying between 100 and 2,000 Å approximately. Such a head has the following advantages:

Given that the two magnetic layers are very thin, their magnetic structure can be single-domain, with easy axis parallel to the line of contact with the tape to be read. In this case, the head has a significant advantage: a single-domain structure does not of course comprise any partitions for separating domains and any noise related to a displacing of partitions under the action of a variable magnetic flux generated by the tape to be read is thus eliminated.

A thick magnetic layer produces a spurious signal, through the finite pole effect, being manifested through a kind of echo which must be eliminated with the aid of a filter. This filter should have a length proportional to the thickness of the magnetic layer. There is therefore every reason to produce an ultrafine layer.

A structure which is symmetric (relative to the central plane of the nonmagnetic layer) has the advantage of using the same equalizing filter for both directions of travel of the tape to be read.

According to an advantageous feature of the invention, the single-domain structure of both thin layers is stabilized by applying to the reading head a permanent magnetic field having the same direction as the head/tape contact line, that is to say the same sense as the easy axis of both magnetic layers. This field will have a typical value less than 100 oersteds.

In FIGS. 3a and 3b have been represented examples of drawings of etching of the magnetic layers allowing the construction of several elementary heads disposed side by side on a single structure (nonmagnetic layer and magnetic layers) such as that of FIG. 2, in order to read a multitrack tape. In the case of FIG. 3a, the individual layers 15.1, 15.2, . . . have a "U"-shaped outline, whereas in the case of FIG. 3b the individual layers 16.1, 16.2, . . . have the shape of parallel rectangular tapes. This etching may affect only the upper magnetic layer or the stack of three layers. It is not strictly necessary when the track width is greater than a few tens of microns. It has a double importance:

it allows the crosstalk between adjacent tracks to be limited,
it allows stabilization of the magnetic structure of the poles
  whose magnetizations tend to couple together head-to-tail in an antiferromagnetic arrangement, as is seen in the view of FIG. 4. In this FIG. 4, the various successive elementary heads are labelled 17.1, 17.2, . . . The arrows drawn on the front faces of the ultrathin magnetic layers in contact with the magnetic tape to be read 18.1, 18.2, . . . and 19.1, 19.2, . . . represent the sense of magnetization of these layers.

A priori, it can be stated that the structure of FIG. 3a is more stable than that of FIG. 3b because of its relatively short length (in a sense perpendicular to the surface of the tape to be read). If, in the structure of FIG. 3a, the poles are lengthened until, in the extreme case, the case of FIG. 3b is attained, the drop in the demagnetizing factor in a sense perpendicular to the inter-iron gap line (perpendicular to the surface of the tape to be read) opposes the effect of orientation of the anisotropic field, and the reading head becomes more sensitive, to the extent of becoming unstable in some circumstances.

The structure of FIG. 3a is more difficult to produce since the polishing of the slice of the structure must be controlled to within a few microns in absolute position and in parallelism. On the other hand, the structure of FIG. 3b can be polished on an automatic machine.

Figure 5:
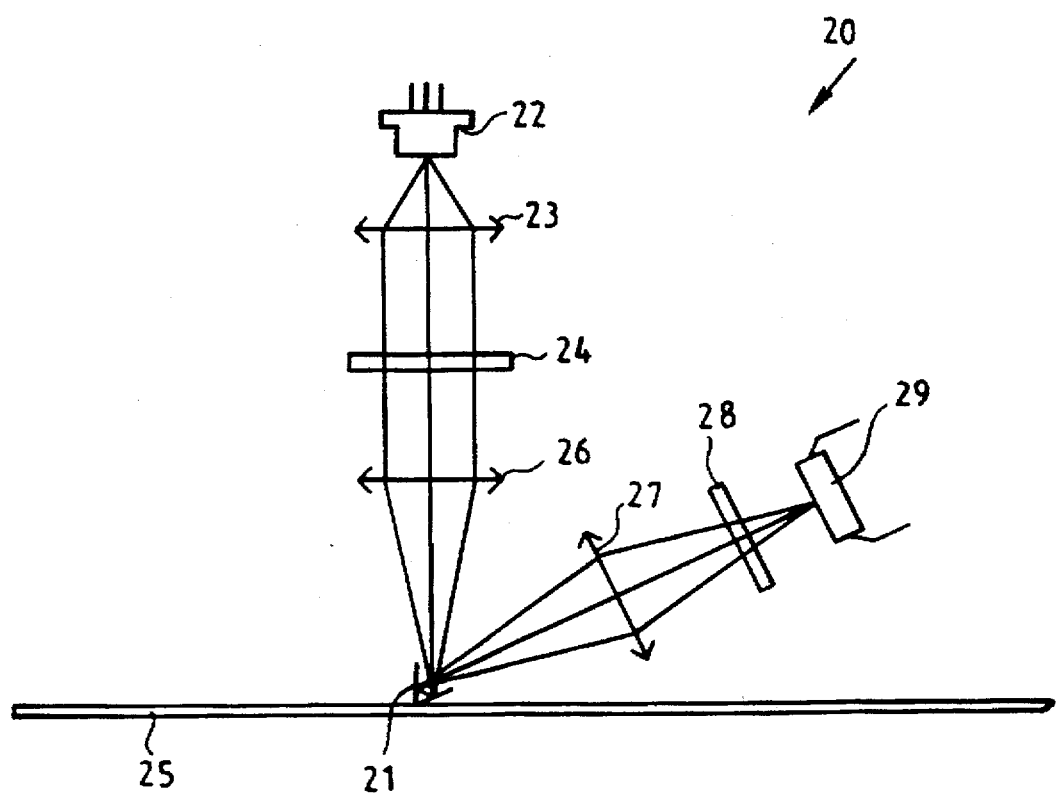
FIG. 5 is a simplified diagram of an opto-electronic reading device using a head according to the invention.

A multitrack magneto-optic reading system 20, comprising a reading head according to the invention, has been represented in FIG. 5. The main importance, for the reading of a multitrack recording, of the use of a Kerr effect head results from the principle of active reading, the performance levels of which are not handicapped by a low speed of travel of the tape to be read, as pointed out above in the preamble. Upstream of the Kerr effect head 21 the system 20 comprises a point source of light 22, preferably a laser diode, a collimating objective 23, a device 24 comprising a polarizer if the source 22 is not polarized, and a $\lambda/2$ plate serving to render the polarization of the light beam crossing it perpendicular to the direction of travel of the tape 25 to be read, and a cylindrical lens 26 oriented so as to focus the beam collimated by the objective 23 along a line perpendicular to the direction of travel of the tape 25.

As disclosed in the present description, the head 21 comprises a Kerr effect sensor and, in some circumstances, an optical reflector.

Downstream of the head 21 the system 20 comprises an optical imaging device 27 typically having a magnification of approximately one; a device 28 comprising an analyzer and, under some circumstances, a phase compensator; and a linear optical sensor 29 whose active zone is the optical conjugate, through the optical system, of the line illuminated on the Kerr effect head. This optical sensor comprises for example a CCD strip. The magnification of the downstream part of the system 20 typically being of the order of one, it can advantageously be produced with integrated optics.

Solutions will now be described allowing the merit factor for the reading head of the invention to be improve. The merit factor is equal to the product of the angle of rotation due to the Kerr effect times the square root of the reflection factor due likewise to the Kerr effect. It can be shown that in the case of a multitrack system the main source of noise is Schottky noise related to the corpuscular nature of light. The signal/noise ratio of the reading system is therefore directly proportional to the merit factor defined above, hence the significance of this merit factor.

The intrinsic merit factor (measured in air, on a very thick layer) for magnetic materials depends on their composition and on their structure. These parameters are likewise involved in the case of thin layers. Advantageously, the magnetic circuits of the head of the invention are produced from alloys with high iron content, such as: pure iron, nitrated iron and carbon iron, "Sendust" (Fe, Al, Si).

In order to improve the merit factor, the invention provides for the use advantageously of optical interference effects.

The use of three-layer structures for improving the merit factor for magneto-optic discs is well known. A derived structure with four layers has been represented in FIG. 6a. This structure comprises in order: a magnetic layer 30, a metallic layer 31 reflective at the wavelength used, a layer 32 made of nonmagnetic material transparent to the wavelength used, and a thin magnetic layer 33 constituting the Kerr effect layer. The incident optical ray 34 arriving at the layer 33 is partly reflected by the latter as a ray 35, and partly crosses the latter layer (ray 36), being reflected on the layer 31 (reflected ray 37) and recrossing the layer 33. The thickness of the layer 32 is chosen so that the path difference between the rays 35 and 37 is equal to half the wavelength of the ray 34. Given that a reflection on a metallic layer brings about a phase shift also equal to half the wavelength, it is observed that there is formed "destructive" interferences between the normally reflected components of the rays 35 and 37, and "constructive" interferences between the magneto-optic components of these same rays 35 and 37. From these phenomena there results an increase in the merit factor for the Kerr effect sensor.

Figure 6A:
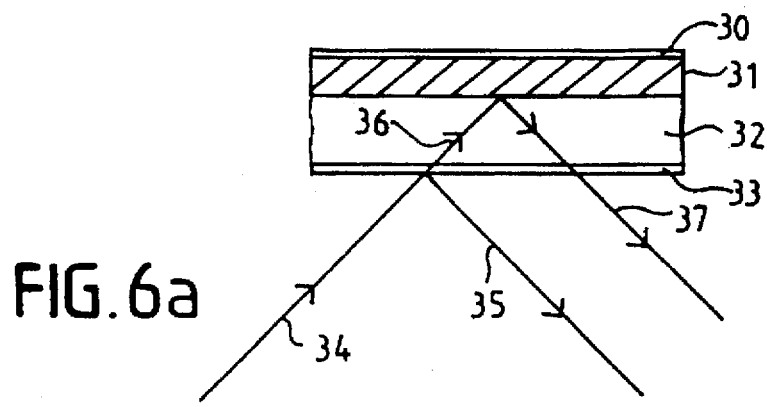
FIGS. 6A to 6D are various simplified diagrammatic views of multilayer elementary heads according to the invention.
Figure 6B:
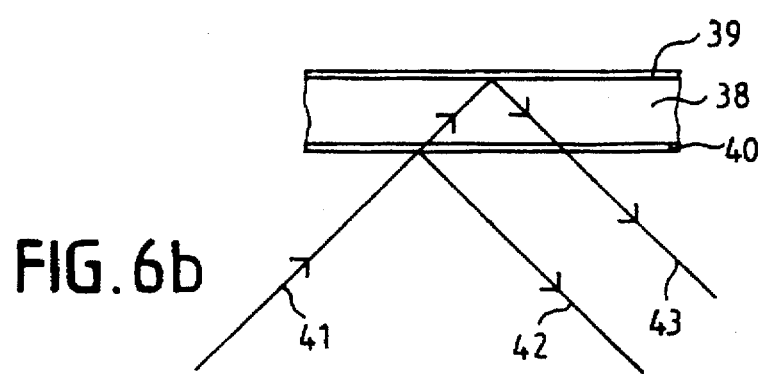

A differential three-layer structure has been represented in FIG. 6b. This structure comprises a layer 38 of nonmagnetic material, transparent to the wavelength used, on one side of which is formed a first magnetic layer 39 and on the other side of which is formed a second magnetic layer 40. Both these magnetic layers exhibit a Kerr effect. By a judicious choice of the angle of incidence of the incident ray 41 and of the refractive index of the dielectric layer 38, this layer 38 can be formed so that its thickness is at one and the same time that necessary for the inter-iron gap of the structure of the transducer and for a λ/2 offset in path of the light rays. In this case, the layer 39 can play the role of the reflector 31 of FIG. 6a in addition to its role of Kerr effect layer. Thus, besides the interference effect described above for FIG. 6a, the structure of FIG. 6b exhibits an effect of combinations of Kerr effect. The rays reflected by the layers 40 and 39 are labelled 42, 43 respectively. The rotation by the Kerr effect of the layer 39 is deducted from that due to the layer 40. There is therefore a rejection of the effect of the symmetrical magnetizations of the two magnetic layers 39, 40 (which could be described as monopole type functioning), and addition of the rotatory effects of the opposing magnetizations of these two layers (dipole type functioning).

Figure 6C:
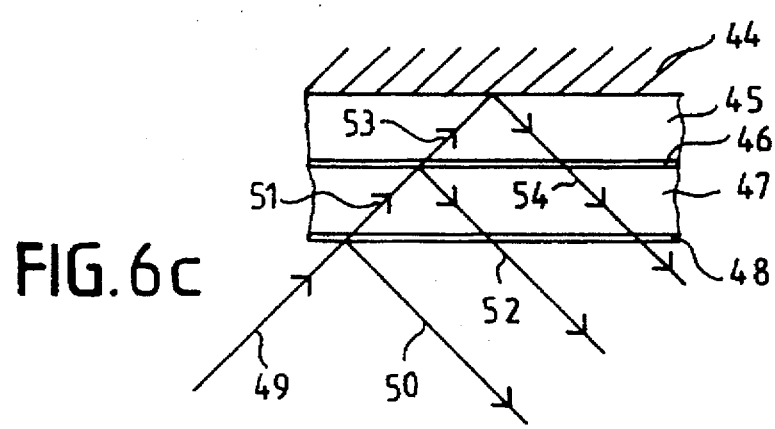

A structure with five very thin layers with differential effect, combining the features and advantages of the structures of FIGS. 6a and 6b, has been represented in FIG. 6c. This structure of FIG. 6c comprises, in order: a reflecting metallic layer 44 (which can be thick), a first dielectric layer 45, a first ultrathin layer of magnetic material 46, a second dielectric layer 47, and a second ultrathin layer of magnetic material 48. The incident ray 49 is in part reflected by the layer 48 (ray 50) and in part transmitted by this layer (ray 51). The transmitted ray 51 is, in its turn, partly reflected by the layer 46 (ray 52) and partly transmitted (ray 53). The transmitted ray 53 is reflected by the layer 44.

In this structure of FIG. 6c, the two dielectric layers 45, 47 have the same thickness and each produce a phase shift equal to half the wavelength used. The structure (46-47-48) makes the rays 50 and 52 interfere in such a way as to intensify the Kerr effect produced by the layer 48, as explained for FIG. 3a.

Similarly, the structure (44-45-46) makes the rays 52 and 54 interfere in such a way as to optimize the response of the second Kerr layer 46, which response is deducted, as in FIG. 3b, from that of the first layer 48. A better rejection of the symmetric (monopole) response can thus be achieved.

Figure 6D:
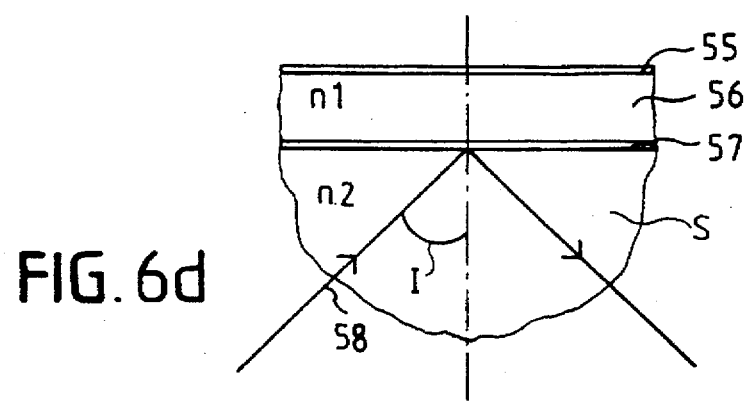

In FIG. 6d has been represented a three-layer structure formed on a substrate S transparent to the wavelength used: magnetic layer 55, dielectric layer 56, magnetic layer 57. If the angle of incidence I of the incident ray 58 and the refractive indices n1 (layer 56) and n2 (substrates) are chosen in such a way that:

$$n2 \cdot \sin I = n1$$

the conjugation of two effects is obtained: total reflection at the interface of the layers 56–57, which produces the same effect as an optimized three-layer structure and, furthermore, the presence of an evanescent wave propagating in the layer 57 produces a rotation by the Faraday effect which is added to the rotation by the Kerr effect, this correspondingly increasing the merit factor for the structure.

In all the structures described above, an additional dielectric index-matching layer can be added between the first magnetic layer (that with Kerr effect) and the substrate. Such an additional layer, when its refractive index is chosen judiciously, plays an anti-reflective role at the substrate-Kerr layer interface, this allowing the incident light energy to be made to interact more efficiently with the magneto-optic layers.

In order to be able to use the magneto-optic structure described above under optimal conditions, the problems of contact with the tape and of optical routing must also be solved. There are described below, with reference to FIGS. 7a to 11, embodiments according to the invention of magnetic heads and of dielectric layers (viewed along the same axis as the structures of FIGS. 2 or 6a to 6d) for the reading of multitrack tapes (the magnetic layers being for example etched as indicated in FIG. 3a or 3b). This transducer structure will simply be called a Kerr structure and will simply be represented in the form of a rectangle. This is also the structure labelled 21 in FIG. 5.

Figure 7C:
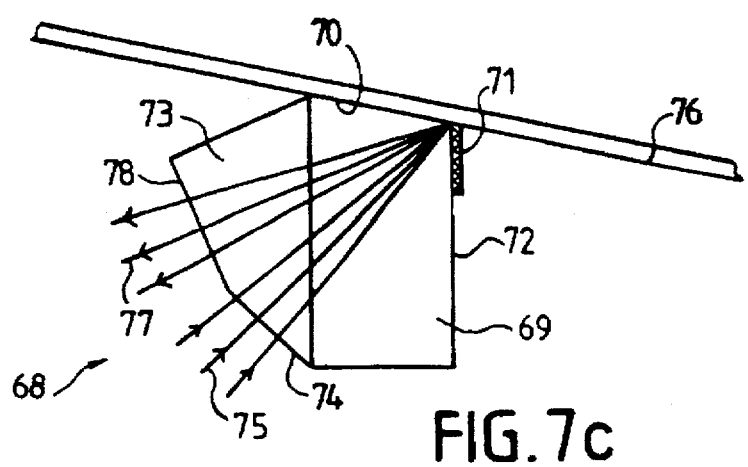
FIGS. 7A, 7B and 7C are simplified side views of a reading head according to the invention with its optical reading beam guide device, without reflection on the face of the device in contact with the tape, and with reflection, respectively.
Figure 7A:
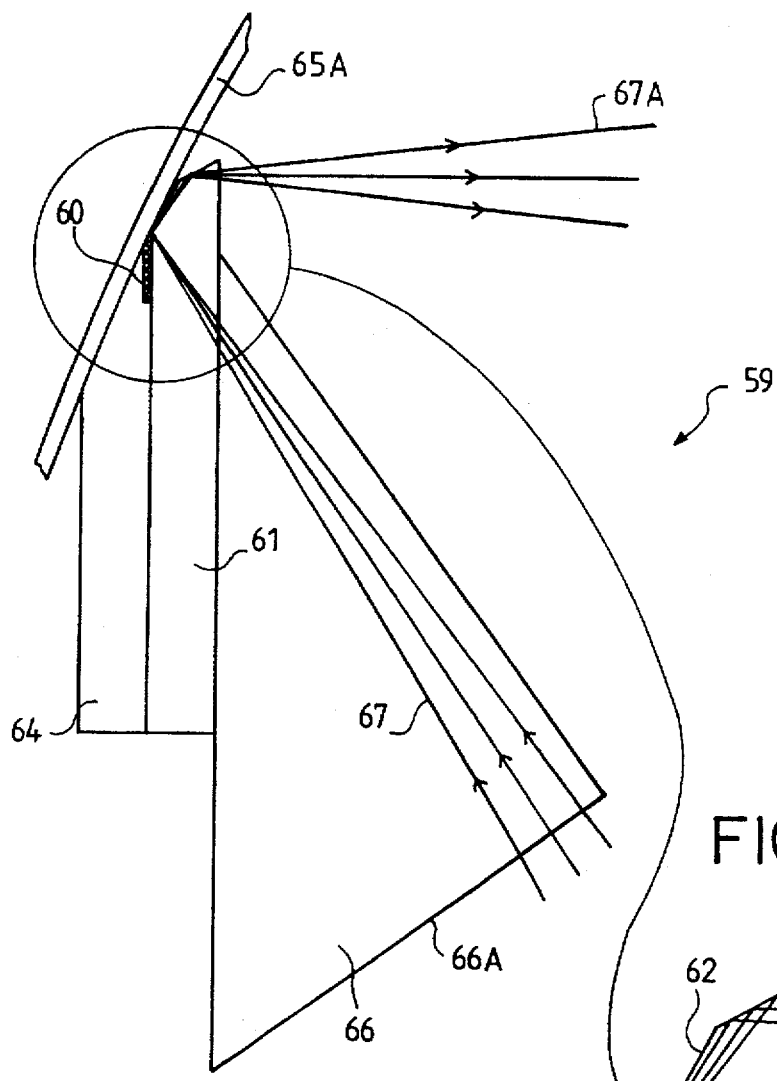
Figure 7B:
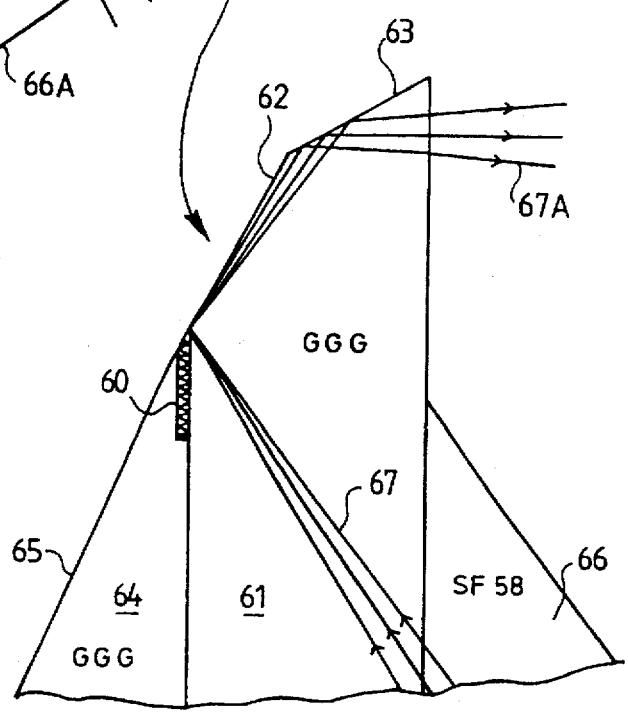

A simplified magneto-optic head 59, without reflector, has been represented in FIG. 7a and 7b. The Kerr structure 60 is produced on a block 61 of nonmagnetic material transparent to the wavelength used. The block 61 has the shape of a parallelepiped truncated at one of its front ends (the anterior end lying to the side of the tape to be read, in proximity to the structure 60) perpendicularly to its narrow lateral faces (that is to say perpendicularly to the plane of the drawing) along two planes making an obtuse angle of approximately 135° between them. Two plane faces 62, 63 making this angle of approximately 135° between them are thus obtained at this front end. Another block 64, produced with the same material as that of the block 61, is cemented onto the large face of the block 61 carrying the structure 60. The anterior face 65 of the block 64 is cut on a slant, continuing on from the face 62, and both these faces are polished in order to form a substantially cylindrical surface on which the tape to be read 65A will pass. An optical ray guide prism 66 is cemented onto the other large face 61. The prism 66 is such that the incident rays 67, entering through its face 66A, arrive directly at the structure 60, are reflected thereat, run alongside the face 62 while slightly separated therefrom, are totally reflected on the face 63 and exit the block 61 (emergent rays 67A). Given that the tape 65A does not come into contact with the face 63, there is no danger of wear to the latter. The reflection on this face 63 will therefore always be total.

The importance of the head 59 is that, besides its simplicity, possible wear due to the tape 65A has no optical effect, since the optical ray 67 is not reflected on the face 62, but on the structure 60 and the face 63. However, this head does not have maximum sensitivity because of the small angle (typically less than 45°) which the tape 65A makes with respect to the structure 60.

In FIG. 7c has been represented a head 68 with glassy total reflection on the polished face of the optical block in contact with the tape to be read.

The head 68 comprises a first optical block 69 substantially in the shape of a right-angled parallelepiped, one front face 70 of which is slightly oblique. The Kerr structure 71 is deposited onto the face 72 of the block 69, along the ridge common to the faces 70 and 72, the face 70 making an angle slightly greater than 90° with the face 72, chosen so as to separate the entrance and exit beams. A block 73 in the shape of an irregular prism is fixed onto the face of the block 69 which is opposite the face 72. The block 73 comprises an entrance face 74 through which the incident ray 75 enters. This ray 75 arrives at the structure 71 near its end in contact with the tape to be read 76 (which is applied to the face 70) and is reflected on this structure in the direction of the face 70 on which it undergoes a total glassy reflection. The ray 77 reflected by the face 70 crosses the blocks 69 and 73 and exits the latter through its face 78. The angle between the rays 75 and 77 is equal to twice the excess over 90° of the angle between the faces 70 and 72. The angle between the faces 74 and 78 is dependent on this angle between the beams 75 and 77.

The structure of the head 68 has a better resolution than that of the head 59 since the typical angle between the face 70 and the normal to the face 72 is typically less than 30°. In order for this structure to function correctly, the tape 76 must not be in excessively good contact with the polished face 70, in order to avoid suppressing the glassy reflection on this face.

In the head 68 described above, the Kerr structure 71 is visible and unprotected. It is therefore vulnerable. In order to protect it, there can advantageously be cemented to the reverse side of this structure a reverse-piece having a thickness close to that of the block carrying this structure, before cutting and polishing the face which will be in contact with the tape to be read.

Figure 8:
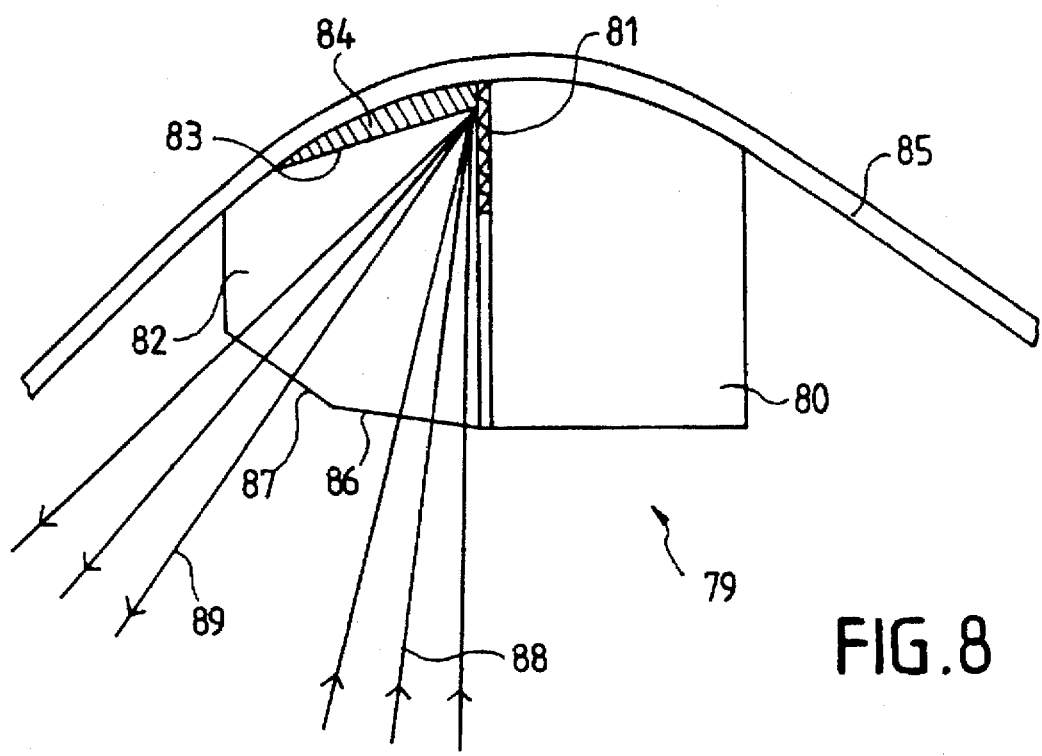
FIGS. 8 to 11 are simplified views of other embodiments of the reading head of the invention with its optical reading beam guide device.

The diagram of a head 79 with integral metallic reflector has been represented in FIG. 8. The head 79 comprises a substrate block 80 on which is produced a Kerr structure 81 and onto which is adjoined a reverse-piece 82 transparent to the wavelength used. The face of the block 82 which is intended to lie to the side of the tape to be read is polished. A reflecting metallic layer 84 is formed on the plane surface 83 thus polished, then the blocks 80, 82 are cemented together, while aligning them so that the layer 84 is nicely tangential to the edge of the Kerr structure 81. The surfaces onto which the tape 85 to be read will be applied are then polished substantially cylindrically. The remaining thickness of the layer 84 in proximity to the structure 81 is at least sufficient to ensure good reflection of light.

The rear part of the block 82 is cut and polished so as to exhibit two plane surfaces 86, 87 making an obtuse angle between them and serving respectively as entrance and exit faces for the incident 88 and emergent 89 light ray. The incident ray 88 is reflected on the reflector 84, and then on the structure 81.

Figure 9:
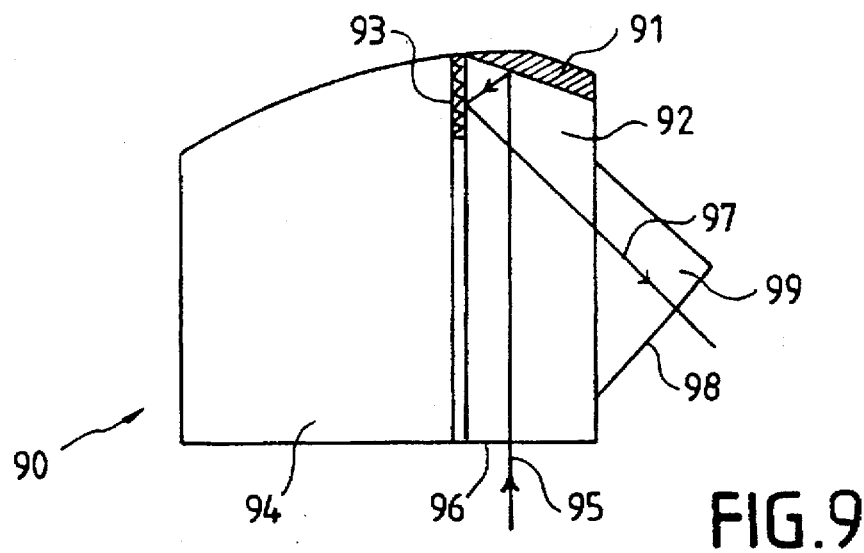

The head 90 of FIG. 9 is a variant of the head 79 of FIG. 8. The metallic reflector 91 is formed on the substrate 92 carrying the Kerr structure 93, instead of being formed on the reverse-piece 94.

The incident ray 95 arrives virtually perpendicularly to the entrance face 96 of the substrate 92, is reflected on the layer 91, and then on the structure 93. The emergent ray 97 exits the head while crossing a prismatic block 98, the exit face 99 of which is substantially perpendicular to the ray 97.

Figure 10:
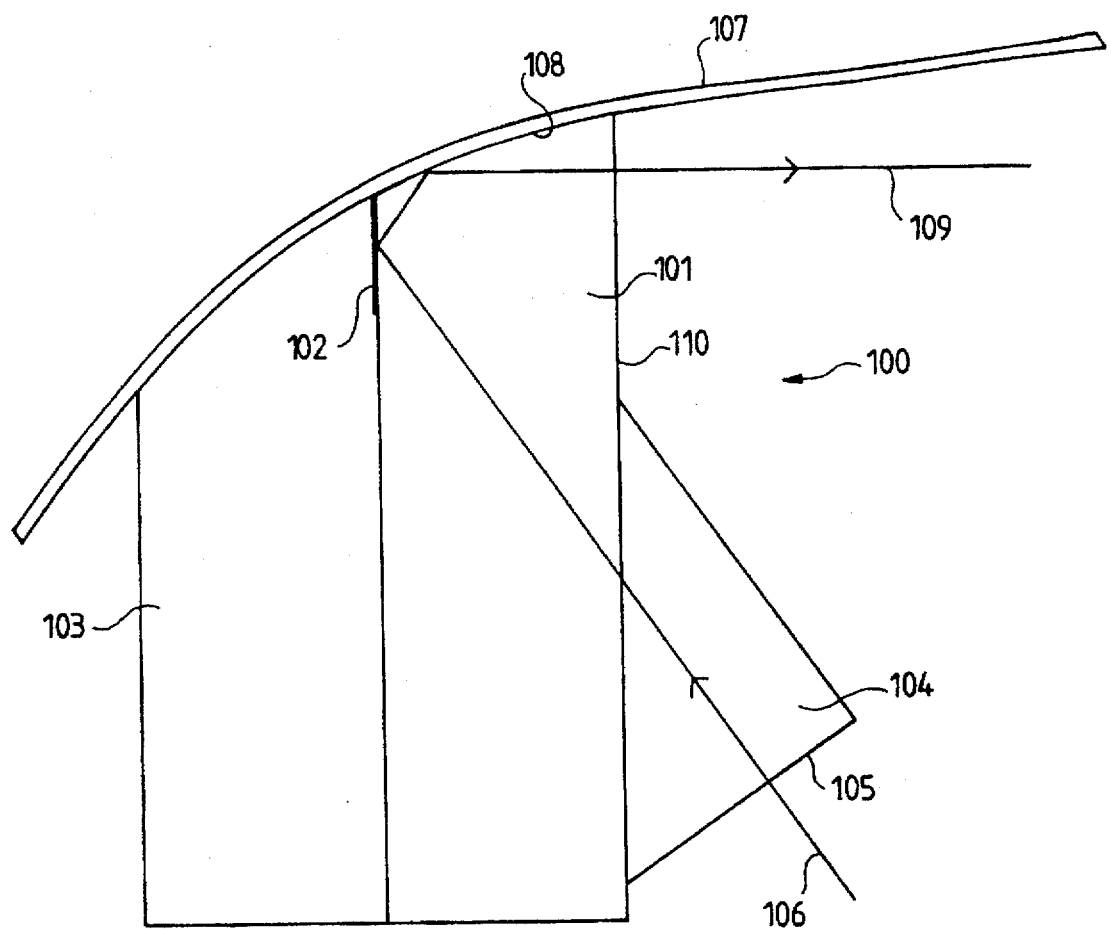
Figure 11:
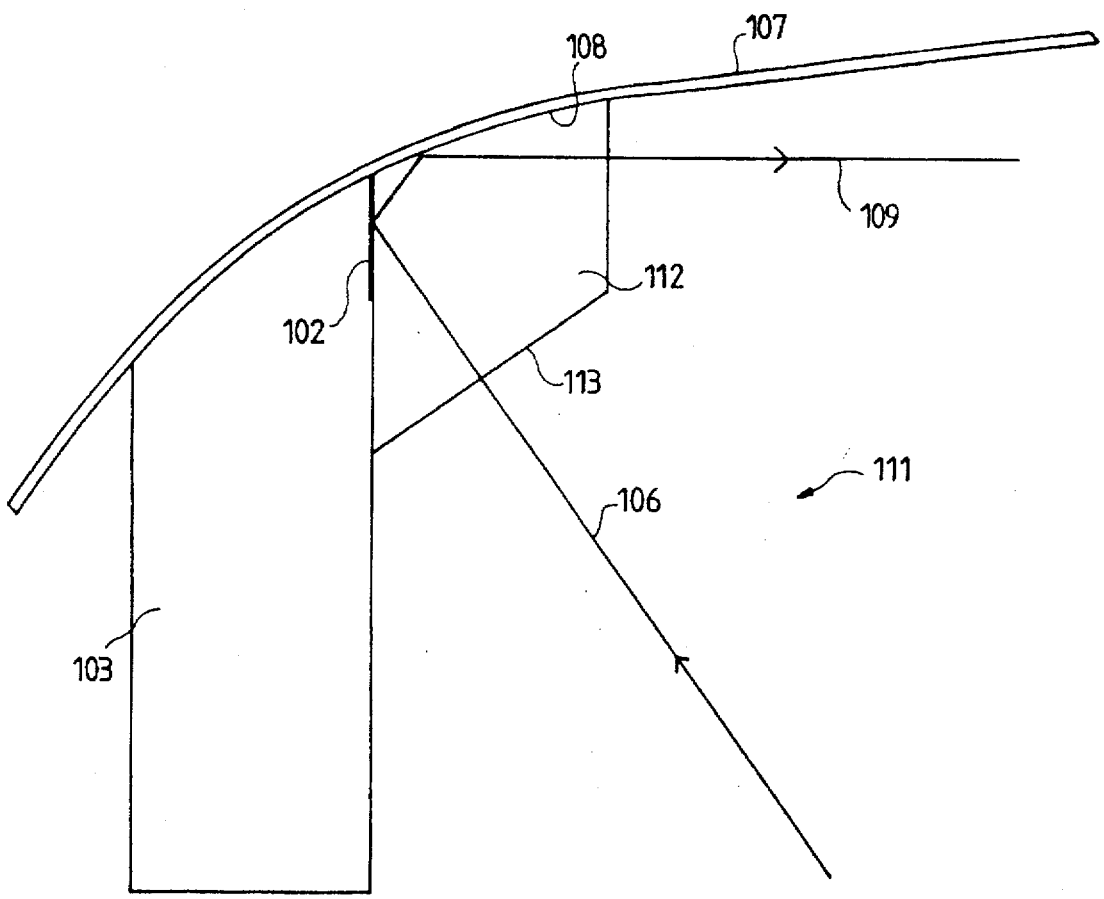

In FIGS. 10 and 11 have been represented embodiments calling upon materials each with a high refractive index: greater than 1.5 and typically close to 2. Thus, even if the tape to be read is in intimate contact with the reflection surface of the optical blocks, it cannot disturb the total reflection since the refractive index of the binders used for manufacturing the tape is at most 1.5.

The head 100 of FIG. 10 comprises a substrate 101 supporting a Kerr structure 102 at the end of one of its large faces. A reverse-piece 103 cemented against the substrate and the structure protects the latter. On the other large face of the substrate 101 is cemented an entrance prism 104 with a triangular cross-section, the entrance face 105 of which makes with the surface of the structure 102 an angle equal to the angle of incidence which the incident ray 106 should make with this structure, the ray 106 being sent perpendicularly to the surface 105. This angle advantageously lies between 30° and 60° approximately. The front surfaces of the blocks 101 and 102 intended to come into contact with the tape to be read 107 are shaped into a substantially cylindrical surface 108. The incident ray 106 is reflected firstly on the Kerr structure 102; then on the face 108 (at which it arrives with an angle of incidence greater than the critical angle) and the emergent ray 109 exits the block 101 perpendicularly to its large face 110 (opposite that carrying the structure 102). Of course, the shape of the surface 108 is determined in order to allow this path of the light ray. If the ray 109 is perpendicular to the face 110 the need to repolish the latter is avoided.

The head 100 can advantageously be produced as follows:
1/ Deposition of the structure 102 onto a substrate (101) of high index, for example SF58 glass, zirconia or GGG. Preferably, the structure 102 is produced like the structure of FIG. 6d, the inter-iron gap material (layer 56 on FIG. 6d) having a refractive index which is the smallest possible, so as to obtain a total reflection at the interface between the magnetic layer (layer 57, FIG. 6d) and the inter-iron gap. This inter-iron gap material is advantageously silica (index close to 1.5) or $MgF_2$ (index 1.38).
2/ Etching of the structure (55 to 57 in FIG. 6d) in order to individualize the heads (for example as indicated in FIG. 3a or 3b).
3/ Cementing of the reverse-piece 103. The reverse-piece is produced preferably with the same material as that of the substrate 101. Preferably, the cement used has the same hardness as the substrate 101.
4/ Sawing of the stack 101-102-103 and rough grinding of the surface 108.
5/ Abrasive-belt finishing of the surface 108 which should have a quality optical polish.
6/ Cementing of the prism 104.

A variant embodiment of the head 100 of FIG. 10 has been represented in FIG. 11. In this FIG. 11, the elements similar to those of FIG. 10 are assigned the same numerical labels.

The head 111 of FIG. 11 differs from the head 100 in that the block 112 is cut so that its incident ray entrance face 113 opposite the rounded front face (defining with the front face of the block 102 the surface 108) is perpendicular to the incident ray 106, the path of the rays 106 and 109 remaining the same in both cases. The entrance prism 104 is thus omitted.

The head 100 or 111 thus has a structure which is virtually unaffected by wear due to the tape to be read. It may therefore be suitable for systems with very high throughput of data to be read, and with significant tape travel speed.

I claim:

1. A magneto-optic multitrack reading head on which an incident light beam impinges, comprising:
 a first layer of magnetic material exhibiting a Kerr effect and which partially reflects the incident light beam to generate a first reflection ray and which partially transmits the incident light to generate an internal ray;

a second layer of magnetic material;

a layer of non-magnetic material formed between the first and second layers of magnetic material and through which the internal ray passes;

means for reflecting the internal ray, wherein the internal ray is reflected off the means for reflecting after passing through the layer of non-magnetic material to generate a second reflection ray parallel to and in phase with the first reflection ray;

wherein a thickness of the layer of non-magnetic material is one-half of a wavelength of the incident light.

2. The magneto-optic multitrack reading head according to claim 1, wherein a magnetic tape to be read is applied to an edge of the first layer of magnetic material.

3. The magneto-optic multitrack reading head according to claim 1, wherein the layer of magnetic material, the second layer of magnetic material and the layer of non-magnetic material are not etched.

4. The magneto-optic multitrack reading head according to claim 1, wherein the means for reflecting the internal ray includes the second layer of magnetic material which further exhibits a Kerr effect and the internal ray reflects off the second layer of magnetic material to generate the second reflection ray.

5. The magneto-optic multitrack reading head according to claim 1, wherein the means for reflecting includes a reflective layer formed between the layer of non-magnetic material and the second layer of magnetic material, the internal ray reflecting off the reflective layer to generate the second reflection ray.

6. The magneto-optic multitrack reading head according to claim 1, wherein the first layer of magnetic material has an easy axis in a plane parallel to a magnetic tape to be read.

7. The magneto-optic multitrack reading head according to claim 1, wherein a thickness of the first layer of magnetic material is between 100 and 2,000 Å.

8. The magneto-optic multitrack reading head according to claim 1, wherein a thickness of the layer of non-magnetic material is between 500 and 30,000 Å.

9. The magneto-optic multitrack reading head according to claim 2, wherein a permanent magnetic field having a same direction as the edge of the first layer of magnetic material is applied.

10. The magneto-optic multitrack reading head according to claim 1, wherein the means for reflecting the internal ray includes the second layer of magnetic material which partially reflects the internal ray to generate the second reflection ray and partially transmits the internal ray to generate a second internal ray, and further comprising:

a second layer of non-magnetic material through which the second internal ray passes; and a reflective layer which reflects the second internal ray after passing through the second layer of non-magnetic material to generate a third reflection ray parallel to the first and second reflection rays.

11. The magneto-optic multitrack reading head according to claim 10, wherein the second layer of magnetic material exhibits a Kerr effect.

12. The magneto-optic multitrack reading head according to claim 1, further comprising a dielectric index-matching layer formed adjacent to the first layer of magnetic material.

13. The magneto-optic multitrack reading head according to claim 1, further comprising a substrate block made of a material transparent to a wavelength of the incident light on which the first and second layers of magnetic material and the layer of non-magnetic material are formed.

14. The magneto-optic multitrack reading head according to claim 13, further comprising a light ray guide block transparent to the wavelength of the incident light and cemented onto the substrate block.

15. The magneto-optic multitrack reading head according to claim 13, further comprising a reverse-piece cemented onto the substrate block.

16. The magneto-optic multitrack reading head according to claim 15, wherein the reverse-piece is made of a material transparent to a wavelength of the incident light and serves in guiding of the incident light and/or reflection rays.

17. The magneto-optic multitrack reading head according to claim 15, wherein a tape to be read contacts the reverse piece, and further comprising a reflective layer in contact with the tape to be read and formed on the reverse-piece.

18. The magneto-optic multitrack reading head according to claim 13, wherein a surface of contact of at least the substrate block with a tape to be read is rounded.

19. The magneto-optic multitrack reading head according to claim 13, wherein the substrate block is formed of a material with a refractive index higher than that of a magnetic layer of a tape to be read.

20. The magneto-optic multitrack reading head according to claim 19, wherein the refractive index of the substrate block is at least 1.5.

* * * * *

UNITED STATES PATENT AND TRADEMARK OFFICE
CERTIFICATE OF CORRECTION

PATENT NO.  : 5,689,391
DATED       : November 18, 1997
INVENTOR(S) : Francois MAURICE It is certified that error appears in the above-identified patent and that said Letters Patent is hereby corrected as shown below:

On the title page, Item [63], the Related U.S. Application Data should read:

-- Continuation of Ser. No. 433,031, May 3, 1995, abandoned, which is a continuation of Ser. No. 741,517, filed as PCT/FR90/00922 Dec. 18, 1990, published as WO91/10234 Jul. 11, 1991, abandoned. --

Signed and Sealed this

Third Day of February, 1998

Attest:

BRUCE LEHMAN

Attesting Officer

Commissioner of Patents and Trademarks